United States Patent [19]

Bayonnet

[11] 4,087,499
[45] May 2, 1978

[54] METHOD FOR CONTROLLING UNIFORMITY IN TIRE TREAD STOCK

[75] Inventor: Jack L. Bayonnet, Akron, Ohio

[73] Assignee: The Goodyear Tire & Rubber Company, Akron, Ohio

[21] Appl. No.: 741,272

[22] Filed: Nov. 12, 1976

Related U.S. Application Data

[62] Division of Ser. No. 602,713, Aug. 7, 1975, abandoned.

[51] Int. Cl.² .................... B29C 17/00; D01F 11/02
[52] U.S. Cl. .............................. 264/40.7; 264/40.4; 264/164; 264/210 R; 264/216; 425/141
[58] Field of Search ............... 264/40.2, 40.5, 40.6, 264/177 R, 40.4, 40.7, 210 R; 425/141

[56] References Cited

U.S. PATENT DOCUMENTS

| 3,265,786 | 8/1966 | Voelker | 425/141 |
| 3,890,078 | 6/1975 | Straumanis | 264/40.7 |
| 3,975,126 | 8/1976 | Wireman et al. | 425/141 |
| 3,989,779 | 11/1976 | Bruanhofer | 264/40.2 |

Primary Examiner—Jay H. Woo
Attorney, Agent, or Firm—R. S. Washburn

[57] ABSTRACT

Uniformity in weight per unit length of continuously extruded tire tread stock is improved by measuring a dimension thereof such as thickness in the tread stock between the extruder die face and the conveyor and controlling the speed of the conveyor in response to deviations from an arbitrary norm of the dimension. A laser beam measuring device for measuring thickness variations in the tread stock before it reaches the conveyor and while the tread stock remains dimensionally unstable following its extrusion.

1 Claim, 1 Drawing Figure

U.S. Patent  May 2, 1978  4,087,499
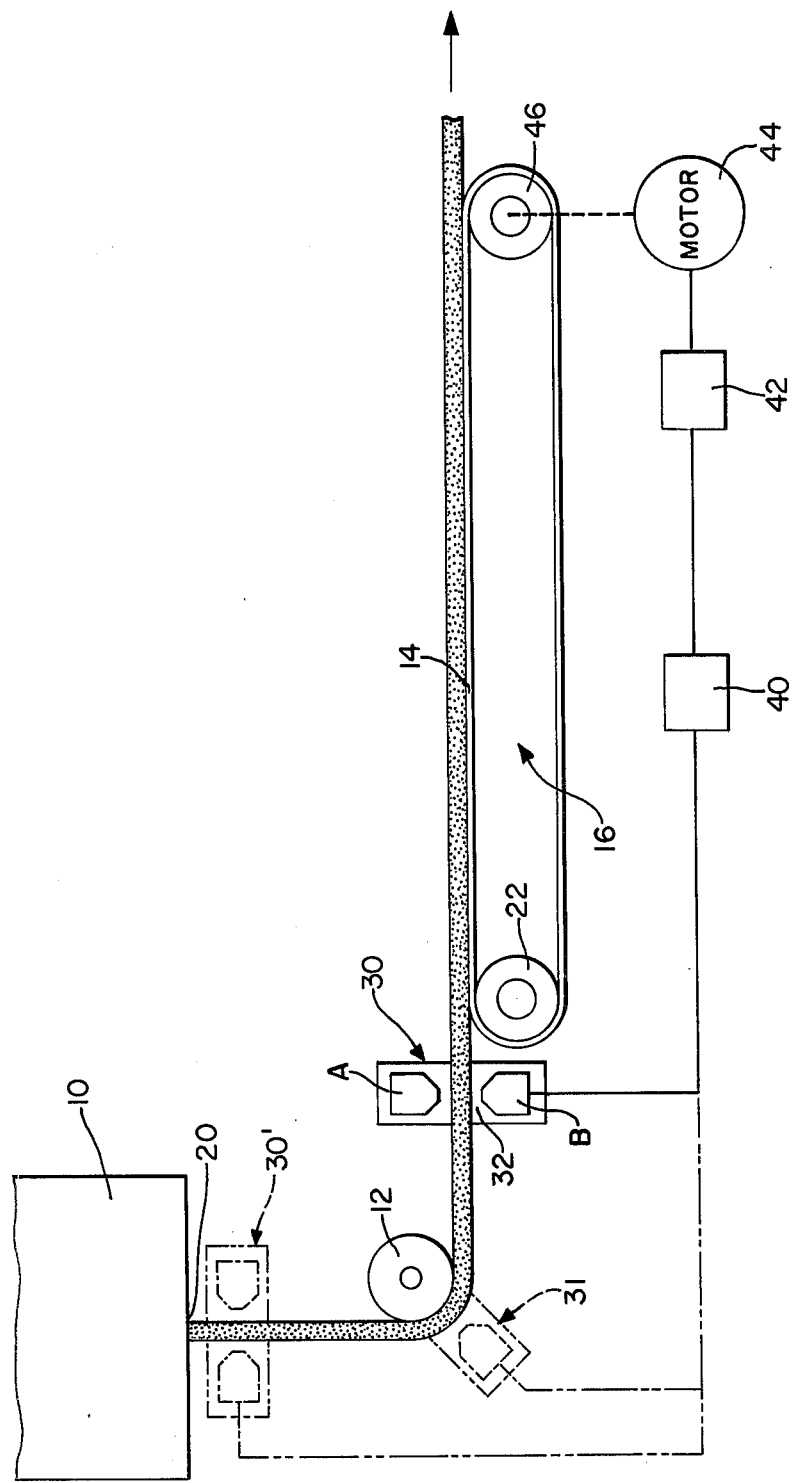

METHOD FOR CONTROLLING UNIFORMITY IN TIRE TREAD STOCK

This is a division of application Ser. No. 602,713 filed Aug. 7, 1975, now abandoned.

The foregoing abstract is not to be taken as limiting the invention of this application, and in order to understand the full nature and extent of the technical disclosure of this application, reference must be made to the accompanying drawings and the following detailed description.

The present invention relates to making tire tread stock for motor vehicle tires, and particularly to methods and apparatus for controlling the uniformity of a running length of such tire tread stock.

Tread stock for motor vehicle tires is normally made by forcing uncured compound of natural and/or synthetic rubbers with other known ingredients through forming means which give to the running length of tread stock a desired cross-sectional shape, often termed "tread profile". Commonly, such tread stock is made by extrusion of the compound by means of an extruder which forces the compound through an extruder die. The characteristics of compounds commonly used, as well as the nature of the process, have long been known to produce variations in the desired uniformity of mass or weight per unit length of such tread stock, as well as in other dimensions of the tread stock.

A principal object of the invention is to obtain improved uniformity of weight per unit length of the tread stock.

The invention is particularly pointed out in claims appended hereto.

To acquaint those skilled in the art with the principles of the invention, preferred embodiments of the invention illustrating the best mode now contemplated for the practice of the invention are disclosed in the following description making reference to the attached drawing.

The attached drawing is a schematic representation of a tire tread making apparatus embodying the present invention.

In the drawing, an extruder 10 provides forming means to shape the tread profile desired in the extruded tire tread stock issuing from the extruder. Upon issuing from the die, the tire tread stock moves first downwardly and is then turned about a stabilizing roll 12 whence it travels horizontally in an unsupported span to conveyor 16.

From the conveyor the tread stock moves continuously to further processing, in accordance with usual known practice, beyond the scope of the present invention, hence not requiring further description here. The further processing, however, includes cutting the tread stock into successive predetermined lengths. It is desired that each length so cut have also a predetermined weight.

Heretofore to attain such predetermined weight, successive cut lengths, called treads, have been weighed and deviations from the specified predetermined weight employed to adjust the speed of the conveyor. Thickness measurements of the tread stock have also been used in like manner. Process correction of this type is commonly referred to as "feed back".

The arrangement thus far described is well known. A particular disadvantage of the feed-back system heretofore used is that at typical extruder-conveyor speeds of from 80 to 110 rpm (about 24–34 meters per minute) a considerable length of tread stock is produced before correction could be effected. Thus successive treads cut from the running tread stock can vary excessively in weight and/or thickness.

In accordance with the present invention measurement of the tread stock is made continuously, upstream from the conveyor and deviations from an empirically determined dimension is used to adjust the speed of the conveyor to effect correction. This procedure is referred to herein as a "feed forward" system.

Between the die face 20 of the extruder 10 and the first roll 22 of the conveyor, the tread stock is unsupported and generally in only light contact with the roll 12 which is free-wheeling and rotated only by the movement of the tread stock. In this unsupported reach of the tread stock, as well known, the dimensions of the tread stock, namely the weight, the thickness, and the density, are continuously changing at any particular location therealong as the tread stock travels through the reach. As the stock exits from the die, the cross-sectional area of the tread stock tends to enlarge or swell, a phenomenon commonly known as die swell. Additionally, the action of the screw of the extruder and the flow characteristics of the compound traveling to and through the die yield additional irregularities in the amount of die swell. Persons skilled in the art have advised against and have avoided attempts to take any measurements of the tread stock in this reach between the die face and the conveyor and particularly have avoided any attempt to control the process in terms of any measurements taken of the dimensionally unstable tread stock in this unsupported reach.

Surprisingly, the applicant has discovered useful correlations between a measurement taken of the stock in this reach and the weight per unit length of the tread stock produced. While measurement of weight or mass of the tread stock traveling through this reach are contemplated, it is found convenient to measure a representative thickness of the stock by measuring means comprising a thickness measuring device 30 by which a continuous scan of thickness of the stock, that is, a distance between oppositely facing surfaces of the stock is made. A measurement useful for control of the process leading to improved uniformity of weight per unit length in the tread stock produced is thereby provided.

The thickness measuring device 30 can be any suitable commercial measuring means capable of continuous measurement of thickness and, preferably, having a resolution of 0.025 mm. or better. In the preferred practice of the present invention, the device 30 employed is a model EPG laser gauge obtained from the Autec Corporation of Columbus, Ohio.

The laser dimension gauge is a differential measuring system having two heads A,B which are mounted in opposing relation, with the tread stock therebetween. A suitable frame 32 supports the gauge rigidly, upstream of the conveyor roll 22 where the unsupported reach of tread stock extending from the die face 20 to the conveyor passes between the two heads.

The two heads of the Autec gauge each direct a laser beam against a surface of the tread stock. Each beam is then reflected along two paths and by a system of mirrors is directed to an image converter as two light points the distance between which represents the actual location of the surface. The face of the converter is periodically swept to generate a pair of pulses produced by the light points on the converter face and which control a gate. The gate allows high frequency clock pulses to flow from a clock oscillator into a converter only during the time period of the sweep between the light points. The number of clock pulses in the counter is thus representative of the actual location of the surface. The respective actual location of the upper and lower surfaces of the tread so measured are compared with the fixed known distance between the two heads to determine the actual thickness of the tread stock.

It is further contemplated within the scope of the invention to locate the gauge device 30, as shown in full line in the drawing, near the roll 22, or as shown in broken line 30' near the die face 20, and in any case so located as to measure the thickness of the tread stock after it leaves the die face and before it reaches the conveyor. Also contemplated is the use of a laser dimension gauge employing only a single measuring head, as is represented in the drawing at 31, disposed opposite the roll 12.

The device 30 provides, in addition to a direct visual readout of thickness, a signal representative of the continuous variation and thickness being measured. This signal is conducted to a conventional filtering amplifying circuit 40 from which the amplified signal is communicated to a speed control means 42 controlling a direct current motor 44 which drives the conveyor drive roll 46 and the conveyor belt. The speed of the conveyor belt is thus made directly responsive to the thickness of the tread as measured by the device 30 in the unsupported reach of the tread stock upstream from the conveyor.

The correction of the weight per unit length and thickness of the tread stock is effected by adjusting the speed of the conveyor in accordance with the invention in response to a "feed forward" signal from the device 30. This is contrary to and a useful improvement over the prior art, in which the corrections were made by feed back from measurements of a weigh-scale measuring the weight of treads cut to length from the tread stock.

While other measuring devices are contemplated as being useful in the practice of the invention, the essential feature of which is the location at which the control measurement is taken, the measuring device preferably operates without contact of the tread stock. In this respect the laser type gauge described is particularly advantageous.

"Feed-forward", as used herein, is to be understood as providing a control signal which is communicated from a sensing device 30 monitoring the tread stock at an earlier, upstream position, to a corrective means, namely the speed regulating means 42 at a later position, downstream, in the process being controlled; it means that a measurement taken at such earlier position anticipates a potential deviation so as to control at such later position the correcting means whereby such deviation is reduced or prevented from occurring. Herein "feed forward" will be understood as contrary to the prior art practice, referred to herein as "feedback", of measuring at a later position, after a deviation has occurred, and then communicating a control signal to an earlier position in the process to reduce or eliminate subsequent deviations. In the prior art process of producing tread stock, a large number of off-standard treads may have already been extruded before the deviation is detected and which, therefore, escape the correction applied to the process at the earlier, upstream position. By the present invention control is preventive, while heretofore control has been corrective to the process after deviations have already occurred.

What is claimed is:

1. A process for making tire tread stock comprising extruding at a constant rate uncured curable stock continuously downwardly through a tread profile forming extruder die to form a tire tread cross-section profile which cross-section profile is subject to die swell associated with the extruding pressure within the stock as the stock issues from the extruder die, receiving and transporting the tread so formed free of transverse confinement on a horizontal conveyor having an adjustable speed drive, and continuously measuring the thickness between oppositely facing top and bottom surfaces of the tread stock profile so formed at a fixed location along said tread stock where the same is subject to said die swell after its exit from said die and before its contact with said conveyor, and continuously regulating said drive in response to variances in said thickness so measured.

* * * * *